United States Patent [19]

Loukanis et al.

[11] Patent Number: 4,711,143
[45] Date of Patent: Dec. 8, 1987

[54] ROCK BIT ASSEMBLY METHOD

[75] Inventors: Jesse J. Loukanis, Houston, Tex.; Will W. Mathews, Germantown, Tenn.; Raymond L. Tune, Houston, Tex.

[73] Assignees: NL Industries, Inc., New York, N.Y.; Cummins Engine Co., Columbus, Ind.

[21] Appl. No.: 890,718

[22] Filed: Jul. 25, 1986

[51] Int. Cl.$^4$ .............................................. E21B 10/08
[52] U.S. Cl. ................................... 76/108 A; 175/375; 175/413
[58] Field of Search ............. 76/108 R, 108 A, 101 E; 175/369, 374, 375, 412, 413, 366; 219/121 EB, 121 EC, 121 ED, 148

[56] References Cited

U.S. PATENT DOCUMENTS

| | | |
|---|---|---|
| 2,057,209 | 1/1935 | Schlumpf . |
| 2,321,484 | 3/1940 | Harrington et al. . |
| 2,329,751 | 7/1942 | Fermier . |
| 2,654,577 | 9/1947 | Green . |
| 2,690,935 | 7/1949 | Alexander . |
| 3,850,256 | 11/1974 | McQueen . |
| 3,907,191 | 9/1975 | Lichte . |
| 3,987,859 | 10/1976 | Lichte . |
| 4,043,411 | 8/1977 | Lichte . |
| 4,045,646 | 8/1977 | Lichte . |
| 4,055,225 | 10/1977 | Millsapps . |
| 4,127,043 | 11/1978 | Evans . |
| 4,158,973 | 6/1979 | Schumacher, Jr. . |
| 4,187,743 | 2/1980 | Thomas . |
| 4,256,194 | 3/1981 | Varel . |
| 4,274,498 | 6/1981 | Penny . |
| 4,276,946 | 7/1981 | Millsapps, Jr. . |

Primary Examiner—Roscoe V. Parker
Attorney, Agent, or Firm—Browning, Bushman, Zamecki & Anderson

[57] ABSTRACT

In a method of assembling a roller cone type rock bit, on a body having a tool joint adjacent one end and at least one leg portion adjacent the other end, the leg portion is provided with a longitudinally outer surface which is inclined longitudinally inwardly from its radially outer extremity to its radially inner extremity; on a base for a cone assembly, an end surface is provided configured to mate with the outer surface of the leg portion of the body; a roller cone is rotatably mounted on the base distal the end surface to form a cone assembly, and the end surface of the base is mated with the outer surface of the leg portion; the base is then welded to the leg portion along the juncture of the mating surfaces to mount the cone assembly on the leg portion.

59 Claims, 7 Drawing Figures

ROCK BIT ASSEMBLY METHOD

BACKGROUND OF THE INVENTION

The present invention pertains to the assembly of roller cone type rock bits. Such bits have enjoyed widespread use in the petroleum industry for many years. Although many improvements have been made in this type of bit to prolong its life, the bits remain primarily a "throw away" item today. That is to say, once the bit, or any portion thereof, is damaged or worn to the point that the bit can no longer function effectively, the entire bit is typically discarded or scrapped and replaced with a new bit, which is quite expensive.

Typically, the wear or damage which causes the bit to stop functioning effectively occurs in or near the roller cone assemblies, e.g. on the working surfaces of the cones themselves and/or in their bearings, as opposed to the upper portion of the bit. Since the upper portion contains the tool joint, specialized formations for lubricant delivery, and the bulk of the material of the bit body, it represents a considerable portion of the overall cost of a new bit. Thus, if the upper portion can be salvaged and reused, a rebuilt bit can be provided at a considerable saving over the cost of a new bit.

U.S. Pat. Nos. 3,850,250 and 4,158,973 suggest methods whereby the legs of a bit with cones mounted thereon are welded to a full annular body portion. The juncture surfaces thus welded are plane horizontal surfaces extending perpendicular to the bit centerline. Said patents also suggest the use of high energy beam welding techniques, such as electron beam welding. Such welding techniques are relatively fast, and minimize heating of the parts being welded. However, they can create other problems. For example, where a weld is formed by a high energy beam, such as an electron beam, the high energy beam emerges from the far side of the joint and strikes any object in its path. The aforementioned horizontal orientation of the surfaces to be joined, as suggested by said prior patents, allows the high energy beam to strike structures which can be damaged thereby, e.g. the tungsten carbide inserts which are carried on the roller cones.

Another group of problems revolves around the fact that the high energy beam tends to rapidly and forcefully displace material in the direction in which it is directed along the joint. Thus, as the weld is formed, a small quantity of molten metal from the parts being joined will actually be carried outwardly from the far side of the joint by the beam and deposited upon any structure which lies in the beam's path. This material, should it land on one of the aforementioned tungsten carbide cutting inserts, would be quite undesirable. The material might also be deposited on one of the openings, bores or passageways which extend through the bit for various purposes, thereby blocking them. The rapid, high energy displacement of material can also cause a problem known as "out-gassing." This can occur when the beam passes a bore or other cavity in the joint area. Gases from such cavity can be "blown" outwardly by the beam, creating bubble-like areas in the finished joint. A similar and related problem is that the material displaced by the beam can partially or even completely plug such cavities, e.g. the lubricant supply channels which extend along the bit legs crossing the weld joint area.

All of the above problems can occur with the joint configurations suggested in the aforementioned prior patents. Efforts to ameliorate at least some of these problems by placing temporary blocking structures along the downstream edges of the joints during welding have not been entirely satisfactory.

Still another problem with these joint configurations is related to the fact that the roller cone assembly must be substantially fully assembled, including the elastomeric seal which seals between the rotary cone and the stationary base, before the base is welded to the main body member of the bit. Even though high energy beam welding techniques tend to minimize heating of the parts being joined, they necessarily cause a significant amount of heating, and with the aforementioned joint configurations, the area of the elastomeric seal would tend to be heated sufficiently to cause concern over the integrity of the seal.

SUMMARY OF THE INVENTION

The present invention addresses the various problems discussed hereinabove to provide techniques whereby high energy beam welding, with all of its attendant advantages, can be used without harming or defacing adjacent portions of the bit. At the same time, the method of the present invention further expedites the process of rebuilding the bit and enhances the quality of the resulting bit. While especially useful in connection with rebuilding of bits using salvaged body members, certain aspects of the method of the present invention are likewise applicable to new bit construction.

More particularly, in the bit assembly method of the present invention, a main body member having a tool joint portion adjacent one end and at least one leg portion adjacent the other end has the longitudinally outer surface of the leg portion machined or otherwise formed so that it is inclined longitudinally inwardly from its radially outer extremity to its radially inner extremity. The end surface of the base of a cone assembly is provided with a mating configuration. A roller cone is rotatably mounted on that base, distal the end surface, to form a cone assembly, whereafter the end surface of the cone assembly base is mated with the outer surface of the leg portion of the main body member. Finally, the base is welded to the leg portion along the juncture of the mated surfaces to mount the cone assembly on the leg portion.

Preferably, this welding is done with an energy beam technique, such as electron beam welding. The unique inclination of the mated surfaces along which the welded joint is formed, and along which the high energy beam is directed, defines a path which bypasses the various portions of the bit which could be harmed by the beam or material displaced thereby, and allows the beam instead to be "buried" in the center of the crown of the bit, where neither the energy of the beam itself nor the excess material carried outwardly thereby will do any harm. This inclination also tends to keep the heat, as much as possible, away from the elastomeric seal of the cone assembly. This effect is enhanced where the inclined outer surfaces of the various leg portions on a given main body member are concave, and more specifically are machined so as to lie along a common conical locus coaxial with the centerline of the main body member.

In accord with another aspect of the invention, it has been found that the out gassing problem which can occur when the energy beam passes the lubricant channels can be controlled if a pin or plug is placed in these channels bridging the juncture of the mated surfaces. Although a solid pin or plug can be used, and later redrilled to provide for lubricant flow in the finished bit, it is also possible to preform the pin with a lengthwise bore. This bore is preferably smaller than those which form the original lubricant supply channels, and thus sufficiently small so that it will not itself cause an out gassing problem, but nevertheless large enough to allow for adequate lubricant flow in the finished bit. Such pin is preferably emplaced in counterbores of the lubricant channels, opening through the outer surface of the leg portion and the end surface of the base respectively. The pin can further be used to properly position the base on the leg portion prior to welding.

It is therefore a principal object of the present invention to provide an improved method of assembling a roller cone type rock bit.

Another object of the present invention is to provide such a method which facilitates the use of high energy beam welding techniques while protecting vulnerable portions of the bit from the effects of the high energy beams.

A further object of the invention is to provide such a method in which the mated surfaces of the leg portion of a main body member and the base of a roller cone assembly are inclined longitudinally inwardly from their radially outer extremities to their radially inner extremities.

Still another object of the present invention is to provide such a method which reduces out gassing problems.

Yet another object of the present invention is to provide such a method which includes a unique technique for properly positioning roller cone assemblies on the bit leg portions to which they are to be welded.

Yet another object of the present invention is to provide an improved roller cone type rock bit.

Still other objects, features and advantages of the present invention will be made apparent by the following detailed description, the drawings and the claims.

DETAILED DESCRIPTION OF THE PREFERRED EMBODIMENTS

Figure 1:
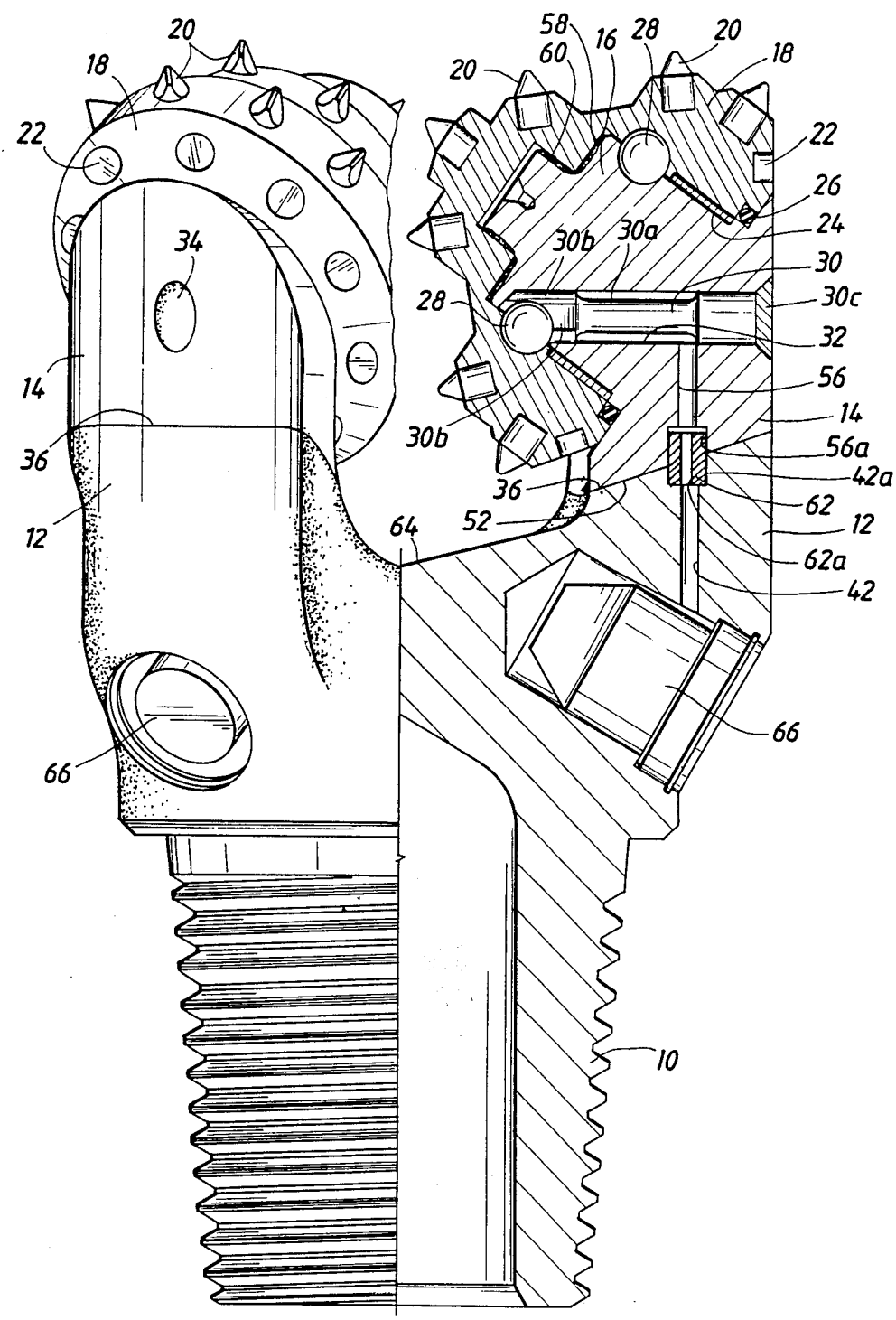
FIG. 1 is a view partly in section and partly in elevation, and with parts broken away, of a bit assembly in accord with a first embodiment of the invention.

FIG. 1 illustrates the parts of a drill bit assembly according to the method of the present invention. FIG. 1 may be considered a view of the parts just prior to the welding step to be described hereinafter, but also corresponds substantially to a like view of a completed bit. It will be understood that the bit is shown in a position it would most likely assume during the manufacturing process, but that its vertical orientation would be reversed in use downhole.

The bit assembly of FIG. 1 includes a bit body having an externally threaded pin connection 10 at one end. In the context of the assembly method of this invention, a "tool joint" portion will refer to a finished connector such as 10, or to an area which may be further machined or treated to finish the connector. The bit body also includes three legs (only two of which are shown in FIG. 1) at the other end of the bit body, extending generally parallel to the bit centerline, but being radially offset from that centerline as well as circumferentially spaced from one another. Each of the bit legs has an inner portion 12 and an outer extension 14. The leg portions 12, along with the pin 10 and the intermediate crown area 64 of the bit body comprise an integral main body member. In one preferred embodiment of the present invention, this member is salvaged from a used bit, although in other embodiments the main body member could be of new manufacture.

The outer portion 14 of each of the bit legs has an integral trunnion or journal member 16 extending angularly therefrom. Each leg extension 14 with its integral trunnion 16 will be jointly referred to as a "base" in this application.

A respective roller cone is mounted on each of the trunnions 16 for rotation with respect thereto. Each roller cone includes a cone body 18 of a suitable metal and a plurality of tungsten carbide inserts 20, mounted in the cone body 18 in the well known manner. The gauge area of each cone body 18 has wear inserts 22 mounted therein. Other types of cones, such as milled tooth cones, can also be used.

The interior of each cone body 18 and the exterior of its respective trunnion 16 have opposed cylindrical surfaces between which is mounted a journal bearing member 24. The interior of the cone body 18 has a counterbore located just outwardly of the bearing 24 and carrying an elastomeric O-ring type seal 26 which seals between the cone body 18 and the trunnion 16 at the wide end of the cone. Inwardly of the bearing 24, the trunnion 16 and cone body 18 are provided with opposed semi-circular ball races within which are disposed a plurality of balls 28. Although the balls 28 may take some bearing load, their primary function is to retain the cone body 18 on the trunnion 16.

The cone assembly comprised of a base 14, 16, its respective cone 18, 20, 22, and the various parts 24, 26 and 28 interposed therebetween may include portions which are salvaged from used bits. However, since most of the wear of a bit occurs in such cone assemblies, they may often be of completely new manufacture. In any event, the assembly is held together by the balls 28, which in turn are retained by a pin 30 in a bore 32 through the base 14, 16. Pin 30, whose configuration and function will be described more fully hereinbelow, is retained by welding.

The main body member 10, 12 of the assembly, while possibly of new manufacture, can advantageously be salvaged from a used bit, since little or no damage has normally occurred in that portion of a bit by the time its cone assemblies have become unusable. To salvage such a member, the legs of the used bit are severed in any suitable way, e.g. by torch cut, along lines roughly parallel to the surfaces 36 to be described more fully hereinafter. Specifically, while generally transverse to the legs of the used bit, these cutting lines should be inclined longitudinally inwardly, i.e. toward the pin 10, from the radially outer extremities of the legs to the radially inner extremities of the legs.

The inclined surfaces thus formed by the rough cuts used to sever the bit legs are subsequently machined to form the outer surfaces 36 of the respective leg portions 12 of the main body member 10, 12. This machining is done, by well known techniques and available equipment, so that the surfaces 36 of the three leg portions 12 are concave and lie on a common conical locus 38, shown in FIG. 3, coaxially with the centerline C. This conical locus 38 forms an angle $\alpha$ with a horizontal plane 40 perpendicular to the centerline C of the shank member 10, 12.

Each of the leg portions 12 has a lubricant supply channel 42 extending generally lengthwise therethrough. After the legs of a used bit are roughcut, and the roughcut surfaces further machined as described above, each lubricant supply channel 42 will open through the outer surface 36 of the respective leg portion 12. Because of the manner in which the salvaged bit was originally constructed, e.g. if constructed by lengthwise joining of three sectors as in prior U.S. Pat. No. 4,187,743, the channels 42 may not be equally spaced from the shank centerline C or symmetrically spaced from each other. The end of each channel 42 opening through the respective surface 36 is counterbored, as shown at 42a in FIG. 2, as well as in FIGS. 1 and 3. Working from a full annular salvaged (or newly constructed) body member 10, 12, it is possible to use the centerline C as a reference point, and the counterbores 42a are positioned with respect to the centerline C so that they are equally radially spaced therefrom and equally circumferentially spaced from one another. Thus, one or more of the counterbores 42a may be eccentric with respect to the remainder of its respective lubricant supply channel 42 as shown in the upper right and lower right of FIG. 2.

Figure 2:
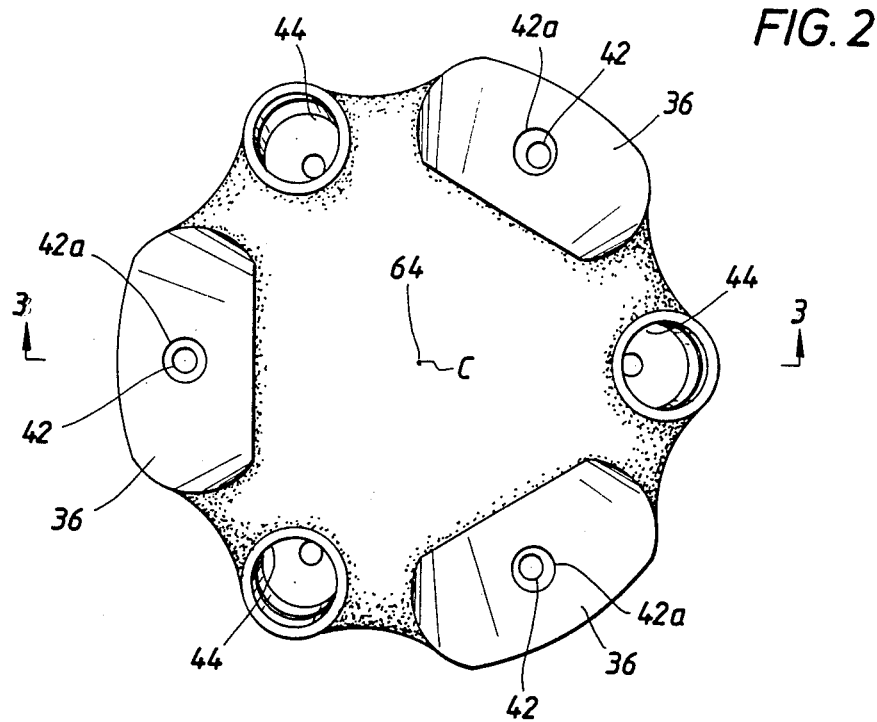
FIG. 2 is a plan view of a main body member to be used in forming the assembly of FIG. 1, taken from the leg end.
Figure 3:
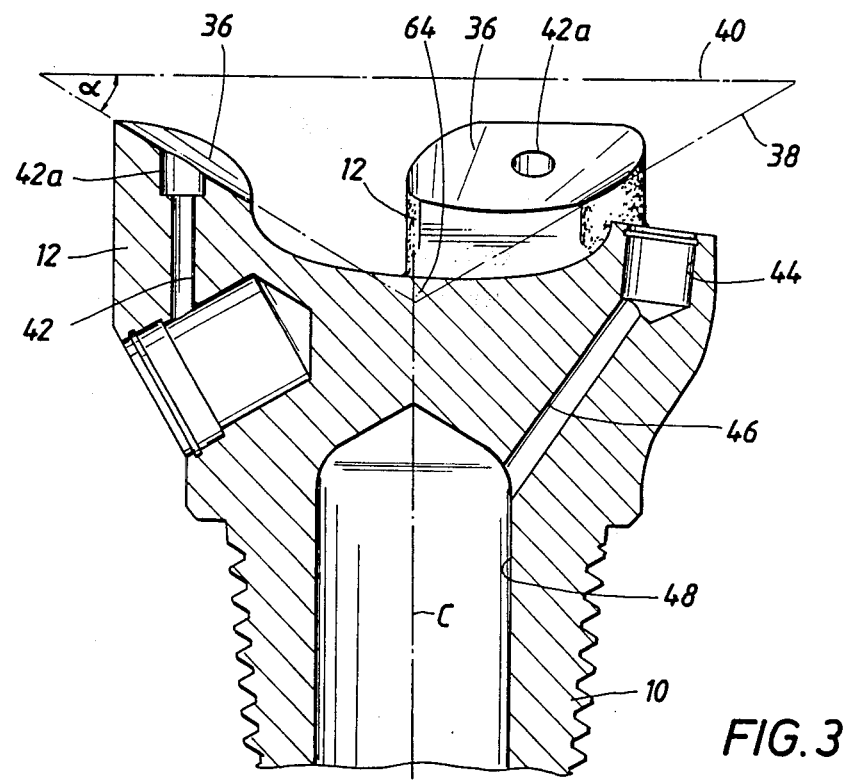
FIG. 3 is a longitudinal cross-sectional view taken on the line 3—3 of FIG. 2.

As also shown in FIGS. 2 and 3, the main body member 10, 12 has three openings 44 circumferentially spaced and interposed between the leg portions 12. The openings 44 communicate via angular bores 46 with a large central bore 48 in the pin end of the member 10, 12. Each opening 44 is adapted to receive a wear-resistant nozzle, and in use, drilling fluid is directed through bores 48 and 46 and the nozzles disposed in openings 44 to cool the cones 18 and flush away rock cuttings. Depending upon the type of lubricant supply system in the bit, there may be three openings (not shown) through the crown 64 radially inwardly of the leg portions 12, but radially outwardly of the centerline C.

The main body member 10, 12, as shown in FIGS. 2 and 3 and thus far described, is substantially prepared for assembly with the other bit parts and welding, as described hereinafter.

Meanwhile, the cone assemblies will have been prepared as follows. Each of the bases 14, 16 has the end surface 52 of its leg extension 14 machined to mate with one of the surface 36. In particular, the surfaces 52 lie on or are defined by a conical locus 54 identical in dimensions to the conical locus 38 defined by surfaces 36, but whereas surfaces 36 are concave, surfaces 52 are convex.

Each of the leg extensions 14 also has a lubricant supply channel 56 extending therethrough, one end intersecting bore 32, and the other end opening through surface 52. The lubricant supply channel 56 is generally positioned to communicate with the lubricant supply channel 42 when the surfaces 52 and 36 are mated.

Channel 56 is counterbored at and adjacent the end thereof which opens through surface 52 as shown at 56a. Proper positions for the counterbores 56a of a set of three cone assemblies may be determined with reference to the prospective bit centerline by placing three bases 14, 16 in question in a common fixture and/or surrounding them by a gauge ring. Thus, as in the case of counterbores 42a, counterbores 56a may be somewhat eccentric with respect to the remainders of their respective lubricant supply channels 56.

After the bases 14, 16 have been properly machined, the cone assemblies are assembled. For example, seal ring 26 and bearing sleeve 24 may be pre-emplaced in the cone body 18 or about the trunnion 16, and then the cone body 18 is mounted on the trunnion 16. Balls 28 are loaded into their race through bore 32, pin 30 is installed in bore 32 to retain the balls in their race and welded in place at its flared outer end 30c.

It is noted that the portion of pin 30 which extends inwardly from the point of intersection of bore 32 and channel 56 is provided with clearance to allow lubricant to pass along pin 30 to the vicinity of the balls 28. In particular, the central portion of pin 30 has a reduced diameter area 30a. The inner end of pin 30 has lengthwise slots 30b extending to the reduced diameter area 30a. The extreme inner end of pin 30 has a curved configuration matching that of balls 28 so that it effectively forms a part of the ball race. Grease passing into the ball race can flow thence into the area of the radial bearing 24 as well as into the nose or small end of the cone body 18. The nose end of the trunnion 16 may include coatings 58 and 60 of a suitable metallic or other material to reduce friction and/or to provide auxiliary thrust and radial bearing area.

With the cone assemblies thus fully assembled, they are emplaced on the main body member 10, 12 for welding. A respective locating pin 62 is placed in each of the counterbores 42a. Then, each surface 52 of one of the cone assemblies is mated with a respective one of the surfaces 36, fitting the other end of locating pin 62 into counterbore 56a. Since the counterbores 42a and 56a are positioned with reference to the bit centerline, they are used, through the intermediary pin 62, to position the cone assemblies with respect to that centerline. A gauge ring may be placed about the three cone assemblies, and fine adjustments may be made by rotating one or more of the cone assemblies about its respective pin 62 to bring it into contact with the gauge ring, and thus, adjust the bit assembly as a whole to full and proper gauge.

As shown in FIG. 1, pin 62 is sized to leave a slight clearance, exaggerated in FIG. 1, at the end of counterbore 56a so that pin 62 will not interfare with proper mating contact between surfaces 36 and 52.

Even though, for reasons explained hereinabove, the small diameter portions of channels 42 and 56 may be slightly offset, i.e. not truly coaxial, as exemplified in FIG. 1, their diameters are large enough so that, when the cone assemblies are mounted with reference to the bit centerline, utilizing pins 62 and their respective counterbores, channels 42 and 56 will still overlap enough to communicate with each other through the central bore 62a of pin 62.

In the embodiment illustrated in FIG. 1, the bore 62a is preformed. It must be large enough to allow for proper communication, even where the channels 42 and 56 are offset, but should be small enough so that it will not create an outgassing problem during the subsequent welding operation. Usually, this means that the diameter of bore 62a will have to be smaller than the diameters of the smaller (non-counterbored) portions of channels 42 and 56. In salvaging typical bits with standard size lubricant supply channels, it has been found useful to utilize a diameter greater than ⅛ inch and less than ⅜ inch for bore 62a. Even more specifically, a diameter of approximately ¼" is appropriate.

Figure 4:
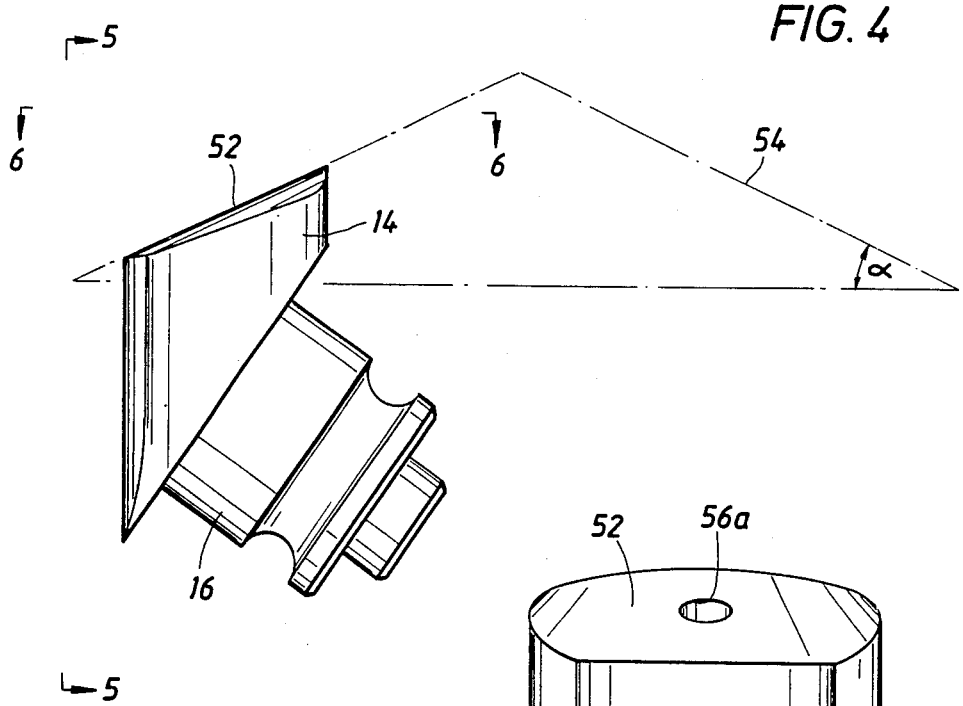
FIG. 4 is an elevational view of one of the cone bases to be used in the assembly of FIG. 1.

With all parts assembled as shown in FIG. 1, the bit legs are formed by welding along mating surfaces 36 and 52. Preferably, the welding is done by energy beam welding, and even more particularly, by electron beam welding or laser welding. If, during this welding process, the beam is controlled and directed so as to follow the conical locus on which surfaces 36 and 52 lie, neither the beam itself, nor any material displaced thereby, will harm vulnerable parts of the bit assembly. In particular, because surfaces 36 and 52 are inclined longitudinally inwardly, i.e. toward pin 10, from the outer to the inner extremities of the bit legs, rather than being horizontal or oppositely inclined in the conventional manner, the electron beam and any metal carried thereby will bypass the cone assemblies, and in particular, the tungsten carbide inserts 20, and instead, will be "buried" in the center of crown 64. Furthermore, by proper choice of the angle α (FIGS. 3 and 4), it can be ensured that the beam and excess metal will bypass any openings in crown 64, and be directed into the very center of the crown 64. Nor will the beam strike or otherwise interfere with the nozzle openings 44, or any nozzle assemblies which may have been pre-emplaced therein. Depending on the particular bit design may be from 5° to 80°. However, in most cases, α is less than 45°. In one typical preferred embodiment, α is about 22.5°.

The inclination of surfaces 36 and 52 likewise keep the beam itself, and the heat affected zone associated therewith, away from the elastomeric seal 26. This effect is further enhanced by the fact that the surfaces 36 and 52 are not merely inclined, but concave in the direction toward the cone end of the bit, lying on the aforementioned conical locus. Coupled with the quickness of electron beam welding, and the minimization of heating of the parts being welded with such welding techniques, the seal 26 is well protected, and it becomes possible to use preferred elastomeric materials in that seal, without the need for concern about heat damage during welding.

After welding, pin 62 may be fused to the bit legs near the weld area, but will remain free of the bit legs on opposite sides of the weld area near the ends of the pins.

Other auxiliary parts of the completed bit, such as nozzle assemblies (not shown) for receipt in openings 44, and lubricant supply mechanisms 66 (which may be of any well known type) may be installed either before or after the welding process, as desired and convenient. In the method as described above, the locating pins 62 were preformed with bores 62a which allow lubricant flow in the completed bit. In an alternative embodiment, a solid locating pin, otherwise identical to pin 62 could be used to position the two portions of each bit leg for welding, and subsequently drilled out by inserting an appropriate drilling tool through the space provided for mechanism 66 and the adjacent channel 42.

Figure 5:
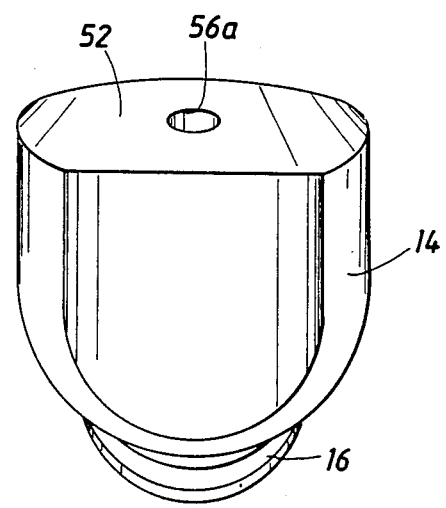
FIG. 5 is an elevational view taken on the line 5—5 of FIG. 4.
Figure 6:
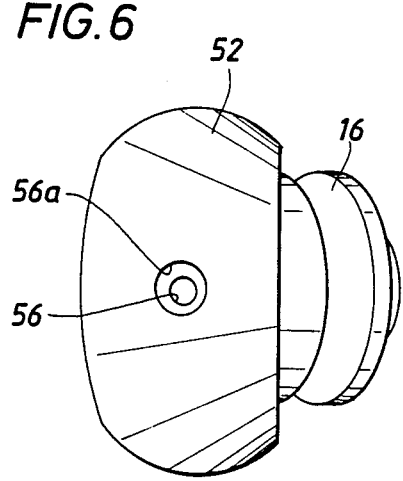
FIG. 6 is a plan view taken on the line 6—6 of FIG. 4.
Figure 7:
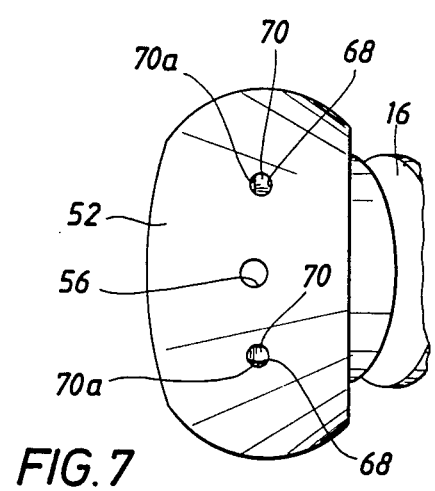
FIG. 7 is a view similar to that of FIG. 6 illustrating a variation in the method of the present invention.

FIG. 7 illustrates still another way of properly positioning the two halves of each bit leg. In particular, on a base otherwise identical to base 14, 16, of FIGS. 4-6, the channel 56 opening through surface 52 is not counterbored. Instead, two smaller bores 68 are provided circumferentially spaced on opposite sides of channel 56 and opening through surface 52. Similar bores would be provided in the mating surface 36. Locating pins 70 are emplaced in each of the openings 68, and would extend into the related openings in a mating surface 36. In order to prevent outgassing, a vent space or clearance is provided between pins 70 and their respective bores by forming a flat along one side of each pin 70 as shown at 70a. This prevents the formation of bubbles in the welded joint from any air which might otherwise have been trapped under pins 70 in the bores in which they are emplaced. In this embodiment of the method of the present invention, depending upon the diameter of channel 56 and the mating channel in the leg portion, it may be necessary to plug those channels in the zone extending across the area to be welded, and later drill out the plug in the manner described hereinabove.

In other variations, the locating pins may be emplaced in the lubricant supply channels, as in the first embodiment, but it may be unnecessary to counterbore the channels.

Numerous other modifications will suggest themselves to those of skill in the art and are within the spirit of the present invention. It is thus intended that the scope of the invention be limited only by the following claims. The order in which steps are recited in the following method claims is not to be construed in a limiting sense unless so indicated by terms such as "first," "then," "next," etc., or unless no other order is possible in practice.

What is claimed is:

1. A method of assembling a roller cone type rock bit comprising the steps of:
    on a main body member having a tool joint portion adjacent one end and at least one leg portion adjacent the other end, providing said leg portion with a longitudinally outer surface which is inclined longitudinally inwardly from its radially outer extremity to its radially inner extremity;
    on a base for a cone assembly, providing an end surface configured to mate with said outer surface of said leg portion of said main body member;
    rotatably mounting a roller cone on said base distal said end surface to form a cone assembly;
    mating said end surface of said base with said outer surface of said leg portion;
    and welding said base to said leg portion along the juncture of said mating surfaces to mount said cone assembly on said leg portion.

2. The method of claim 1 wherein said welding is done by energy beam welding.

3. The method of claim 2 wherein said welding is done by electron beam welding.

4. The method of claim 1 wherein said main body member comprises a plurality of such leg portions radially offset from the centerline of said main body member and circumferentially spaced from one another; such an outer surface is provided on each of said leg portions; such end surfaces are provided on the bases of a plurality of such cone assemblies; and each of said cone assemblies is so mounted on a respective one of said leg portions.

5. The method of claim 4 wherein said outer surfaces are concave.

6. The method of claim 5 wherein said outer surfaces are configured to lie on a common conical locus coaxial with the centerline of said main body member.

7. The method of claim 6 wherein the angle between said conical locus and a plane perpendicular to the centerline of said main body member is between 5° and 80° inclusive.

8. The method of claim 7 wherein said angle is less than or equal to 45°.

9. The method of claim 8 wherein said angle is approximately equal to 22.5°.

10. The method of claim 6 wherein said outer surfaces are so configured by machining.

11. The method of claim 6 wherein said main body member is formed from a used drill bit by severing the bit legs and machining the surfaces exposed by such severing to form said outer surfaces.

12. The method of claim 6 wherein each of said bases comprises a leg extension and a trunnion portion on which said roller cone is mounted, said trunnion portion extending angularly from said leg extension, and wherein an elastomeric seal is emplaced between each of said bases and its respective cone, near the juncture of said leg extension and said trunnion portion, prior to such mating and welding.

13. The method of claim 4 wherein each of said leg portions has a lubricant supply channel formed therein opening through said outer surface; each of said bases has a lubricant supply channel formed therein opening through said end surface; and when each of said end surfaces is so mated with the respective outer surface, a locating pin is emplaced with one end in the lubricant supply channel of said leg portion and the other end in the lubricant supply channel of said base to position said base on said leg portion.

14. The method of claim 13 wherein prior to said mating, each of said lubricant channels is counterbored, said counterbores opening through the respective outer surfaces or end surfaces; and said locating pin is sized to fit said counterbores and is so emplaced in said counterbores.

15. The method of claim 14 wherein said locating pin is provided with a lengthwise bore prior to such emplacement.

16. The method of claim 15 wherein the diameter of said bore of said locating pin is less than the diameters of said lubricant supply channels.

17. The method of claim 16 wherein the diameter of said bore in said locating pin is greater than $\frac{1}{8}$ inch and less than $\frac{3}{8}$ inch.

18. The method of claim 17 wherein the diameter of said bore of said locating pin is approximately equal to $\frac{1}{4}$ inch.

19. The method of claim 13 wherein said locating pin as so emplaced prior to said welding is solid, said method comprising the further step of forming a lengthwise bore through said locating pin after said welding.

20. The method of claim 13 wherein, after said mating and prior to said welding, a gauge ring is emplaced in surrounding relation to said cone assemblies, at least one of said cone assemblies being rotated about the respective locating pin to position said cone assembly within said gauge ring and in contact therewith.

21. The method of claim 4 wherein a locating bore is formed in each of said leg portions opening through said outer surface; a locating bore is formed in each of said bases opening through said end surface and positioned to generally oppose the opening of the locating bore of a respective one of said leg portions when said end surface is so mated with said outer surface; and when each of said end surfaces is so mated with the respective outer surface, a locating pin is emplaced with one end in the locating bore of the leg portion and the other end in the locating bore of the base to position the base on the leg portion; and further comprising providing a vent space along said locating pins.

22. The method of claim 21 wherein each of said leg portions has a lubricant supply channel formed therein opening through said outer surface; each of said bases has a lubricant supply channel formed therein opening through said end surface; two of said locating bores are formed in each of said bases and leg portions, spaced from the respective lubricant supply channel on opposite sides thereof; and when each of said end surfaces is so mated with the respective outer surface, two such locating pins are emplaced—each in a respective pair of opposed locating bores.

23. The method of claim 21 wherein said locating bores are cylindrical, and said vent space is provided by providing a flat on one side of an otherwise generally cylindrical locating pin.

24. The method of claim 22 wherein said lubricant supply channels are plugged adjacent the junctures of said mated end surfaces and outer surfaces prior to said welding, and are subsequently reopened.

25. A method of assembling a roller cone type rock bit using:
   a main body member having a tool joint portion adjacent one end and at least one leg portion adjacent the other end, said leg portion having a longitudinally outer surface, and said leg portion having a lubricant supply channel opening through said outer surface; and
   a base for a cone assembly having an end surface configured to mate with said outer surface of said leg portion of said main body member, and a lubricant supply channel opening through said end surface;
   comprising the steps of:
   providing a locating pin with a lengthwise bore whose diameter is greater than $\frac{1}{8}$ inch and less than $\frac{3}{8}$ inch;
   emplacing said locating pin with one end in the lubricant supply channel of said leg portion and the other end in the lubricant supply channel of said base, and mating said end surface with said outer surface;
   and welding said base to said leg portion along the juncture of said mating surfaces to mount said cone assembly on said leg portion.

26. The method of claim 25 including counterboring said lubricant supply channels so that the counterbores open through said outer surface and said end surface respectively, and fitting said locating pin in said counterbores.

27. The method of claim 25 wherein, prior to mating of said end surface and said outer surface, a roller cone is rotatably mounted on said base distal said end surface to form a cone assembly.

28. The method of claim 27 wherein said welding is done by energy beam welding.

29. The method of claim 28 wherein said welding is done by electron beam welding.

30. The method of claim 26 wherein said main body member comprises a plurality of such leg portions radially offset from the centerline of said main body member and circumferentially spaced from one another, such counterbores are formed in each of said leg portions and in a corresponding number of such bases, the end surface of each of said bases is so mated with the outer surface of a respective one of said leg portions by so emplacing a respective such locating pin, and each of said bases is so welded to the respective leg portion.

31. The method of claim 25 wherein the diameter of said bore of said locating pin is less than the diameters of the lubricant supply channels.

32. The method of claim 25 wherein said diameter of said bore of said locating pin is approximately equal to ¼ inch.

33. A roller cone type rock bit comprising a bit body having a tool joint portion at one end and a plurality of legs at the other end, the legs extending generally parallel to the centerline of the bit body, but being radially offset from said centerline and circumfertially spaced from one another, each of said legs having a respective roller cone rotatably carried on its outer end, and each of said legs being comprised of two portions rigidly adjoined by welding along a juncture area extending generally transversely across the leg and inclined toward said tool joint portion from the radially outer extremity of the leg to the radially inner extremity of the leg.

34. A bit according to claim 33 wherein said juncture areas are concave toward said other end of said bit body.

35. A bit according to claim 34 wherein said juncture areas of said legs lie on a common conical locus coaxial with the centerline of the bit.

36. A bit according to claim 35 wherein the angle between said conical locus and a plane perpendicular to the centerline of the bit is between 5° and 80° inclusive.

37. A bit according to claim 36 wherein said angle is less than or equal to 45°.

38. A bit according to claim 37 wherein said angle is approximately equal to 22.5°.

39. A bit according to claim 35 further comprising a respective elastomeric seal ring between each of said legs in its respective cone near the wide end of said cone.

40. A bit according to claim 33 wherein said juncture area of each of said legs forms an angle with a plane perpendicular to the centerline of the bit, the angle being between 5° and 80° inclusive.

41. A bit according to claim 40 wherein said angle is less than or equal to 45°.

42. A bit according to claim 41 wherein said angle is approximately equal to 22.5°.

43. A bit according to claim 33 wherein each of said legs has a lubricant supply channel formed generally lengthwise therein and passing through said juncture area, and said bit further comprising a respective locating pin disposed in each of said lubricant supply channels bridging said juncture area and being free from said leg on opposite sides of said juncture area, and each of said locating pins having a bore extending generally lengthwise therethrough and communicating at each end with the respective lubricant supply channel.

44. A bit according to claim 43 wherein each of said lubricant channels is widened along a zone extending through said juncture area, and each locating pin is disposed in the respective widened zone.

45. A bit according to claim 44 wherein the diameters of the bores of said locating pins are less than the diameters of the respective lubricant supply channels.

46. A bit according to claim 45 wherein the diameter of each of said bores in said locating pins is greater than ⅛ inch and less than ⅜ inch.

47. A bit according to claim 46 wherein the diameter of each of said bores in said locating pins is approximately equal to ¼ inch.

48. A bit according to claim 44 wherein at least one of said locating pins and its respective widened zone are disposed eccentrically with respect to the remainder of the respective lubricant supply channel.

49. A bit according to claim 33 wherein each of said legs has a lubricant supply channel extending generally lengthwise therein and passing through said juncture area, each of said legs further has a locating bore extending generally lengthwise therein and passing through said juncture area, spaced from said lubricant supply channel, said bit further comprising a respective locating pin disposed in each of said locating bores and having a vent space therealong.

50. A bit according to claim 49 wherein each of said legs has two such locating bores, circumferentially spaced on opposite sides of the respective lubricant supply channel, and a respective such locating pin in each of said locating bores.

51. A bit according to claim 49 wherein each of said locating bores is generally cylindrical, and each of said locating pins has a flat extending along one side, the locating pin being otherwise generally cylindrical, said flat defining said vent space.

52. A roller cone type rock bit comprising:
a bit body having a tool joint portion at one end and a plurality of legs at the other end, said legs extending generally parallel to the centerline of said bit body but being radially offset from said centerline and circumferentially spaced from one another, each of said legs having a respective roller cone rotatably mounted thereon, and each of said legs being comprised of two portions rigidly adjoined by welding along a juncture area extending transversely across the leg, each of said legs further having a lubricant supply channel extending generally lengthwise therein and crossing said jucture area;
and a respective locating pin disposed in each of said lubricant supply channels bridging said juncture area and being free from said leg on opposite sides of said juncture area, each of said locating pins having a bore extending generally lengthwise therethrough and communicating at each end with the respective lubricant supply channel, the diameters of said bores of said locating pins being greater than ⅛ inch and less than ⅜ inch.

53. A bit according to claim 52 wherein each of said lubricant channels is widened along a zone extending through said juncture area, and each locating pin is disposed in the respective widened zone.

54. A bit according to claim 53 wherein the diameter of the bore of each of said locating pins is less than the diameter of the respective lubricant supply channel other than in said widened zone.

55. A bit according to claim 52 wherein the diameter of the bore of each of said locating pins is approximately equal to ¼ inch.

56. A method of assembling a roller cone type rock bit using:
a main body member having a tool joint portion adjacent one end and at least one leg portion adjacent the other end, said leg portion having a longitudinally outer surface, and said leg portion having a lubricant supply channel opening through said outer surface; and a base for a cone assembly having an end surface configured to mate with said outer surface of said leg portion of said main body member, and a lubricant supply channel opening through said end surface;

comprising the steps of;

emplacing a solid locating pin with one end in the lubricant supply channel of said leg portion and the other end in the lubricant supply channel of said base, and mating said end surface with said outer surface;

welding said base to said leg portion along the juncture of said mating surfaces to mount said cone assembly on said leg portion;

and then forming a lengthwise bore through said locating pin.

57. A method of assembling a roller cone type rock bit using:

a main body member having a tool joint portion adjacent one end and a plurality of leg portions adjacent the other end, radially offset from the centerline of said main body member and circumferentially spaced from one another, each of said leg portions having a longitudinally outer surface and a lubricant supply channel opening through said outer surface; and a plurality of bases for cone assemblies, each having an end surface configured to mate with said outer surface of one of said leg portions of said main body member, and a lubricant supply channel opening through said end surface;

comprising the steps of:

rotatably mounting a respective roller cone on each of said bases, distal the end surface, to form a cone assembly;

emplacing a respective locating pin with one end in the lubricant supply channel of each leg portion and the other end in the lubricant supply channel of a respective base, and mating said end surface with said outer surface;

emplacing a gauge ring in surrounding relation to said cone assemblies, and rotating at least one of said cone assemblies about the respective locating pin to position said cone assembly within said gauge ring in contact therewith;

and welding said base to said leg portion along the juncture of said mating surfaces to mount said cone assembly on said leg portion.

58. A roller cone type rock bit comprising:

a bit body having a tool joint portion at one end and a plurality of legs at the other end, said legs extending generally parallel to the centerline of said bit body but being radially offset from said centerline and circumferentially spaced from one another, each of said legs having a respective roller cone rotatably mounted thereon, and each of said legs being comprised of two portions rigidly adjoined by welding along a juncture area extending transversely across the leg, each of said legs further having a lubricant supply channel extending generally lengthwise therein and crossing said juncture area, each of said lubricant channels being widened along a zone extending through said juncture area;

and a respective locating pin disposed in the widened zone of each of said lubricant supply channels bridging said juncture area, each of said locating pins having a bore extending generally lengthwise therethrough and communicating at each end with the respective lubricant supply channel;

at least one of said locating pins and its respective widened zone being disposed eccentrically with respect to an adjacent portion of the respective lubricant supply channel.

59. A bit according to claim 58 wherein each of said pins is free from said leg on opposite sides of said juncture area.

* * * * *